Jan. 26, 1971 E. C. EBNER 3,557,480
PICTURE HOLDER AND DISPLAY
Filed Sept. 9, 1968
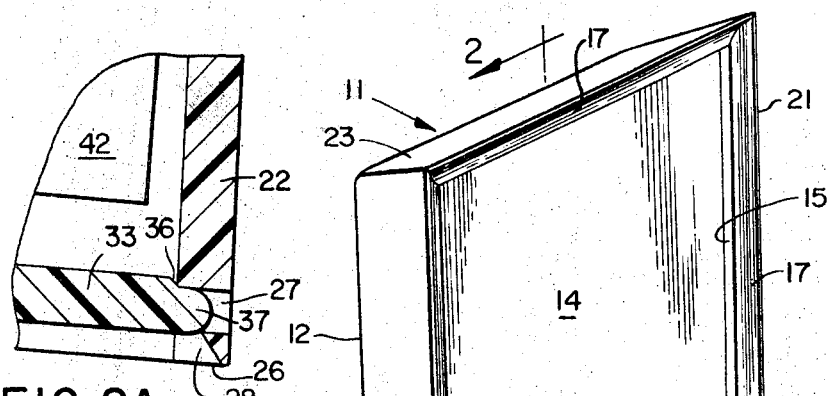
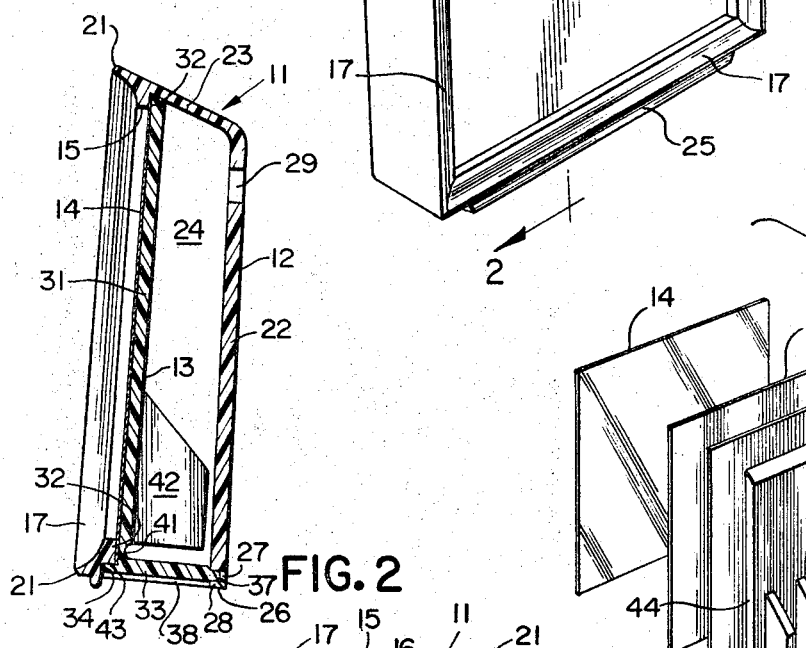
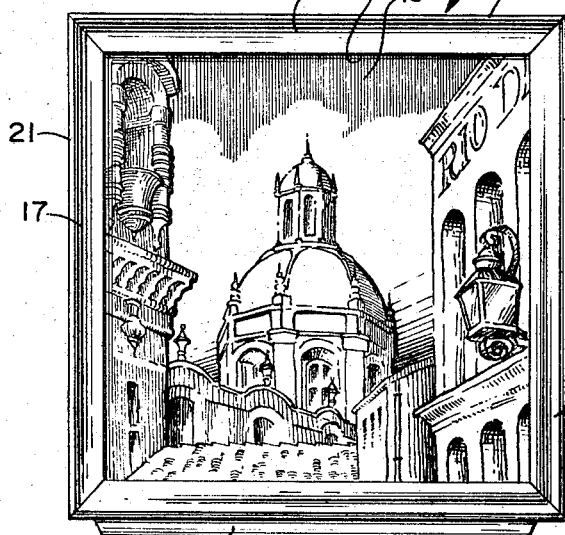
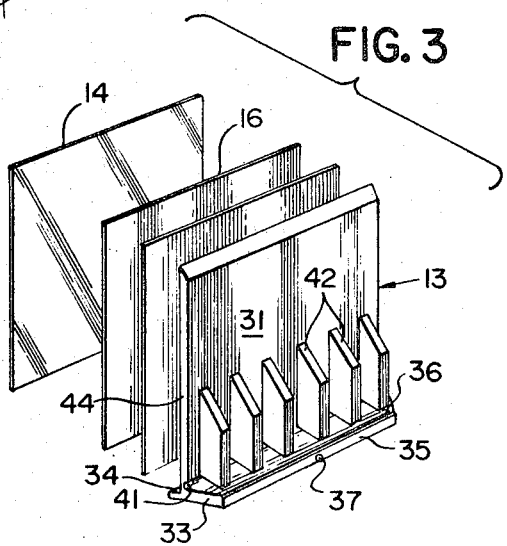
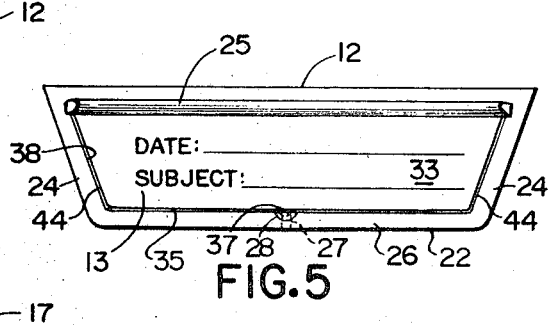
INVENTOR.
EMANUEL C. EBNER
BY
ATTORNEYS

United States Patent Office 3,557,480
Patented Jan. 26, 1971

3,557,480
PICTURE HOLDER AND DISPLAY
Emanuel C. Ebner, Chelmsford, Mass., assignor to Foto-Cube, Inc., Chelmsford, Mass., a corporation of Massachusetts
Filed Sept. 9, 1968, Ser. No. 758,429
Int. Cl. G09f 1/12
U.S. Cl. 40—152.1
13 Claims

ABSTRACT OF THE DISCLOSURE

A rigid, three-dimensional, hollow picture holder and support capable of being hung on a wall or stood on a flat surface. The body has a framed opening on the front. A removable retainer, being formed with a gravity concentrating mass, holds pictures in place within the body in proper position to be viewed through the opening. Several pictures may be stored within the holder and may be interchanged with the picture being displayed as desired.

FIELD OF THE INVENTION

This invention relates in general to picture holders and more particularly concerns a novel holder for interchangeably displaying pictures within a framed opening in a rigid, three-dimensional, hollow body, the picture holder being adapted to stand freely on a flat surface or to be hung on a wall.

DISCUSSION OF THE PRIOR ART

Snapshots, photographs and significant certificates are best enjoyed and appreciated when openly displayed. Their value, especially family favorite pictures, is greatly diminished when stored in closed photograph albums, which are normally perused infrequently at best. However, the sheer number of such articles which one would like to display generally makes it impractical to provide frames for them all. The likely result is that they provide enjoyment only on the rare occasion when the albums are brought out for a period of reminiscence.

Literally countless ways have been devised for displaying such two-dimensional articles. Certain of these display means are useful for some purposes, such as hanging on a wall, but are not as well adapted for other purposes, such as standing on a flat surface. With particular regard to the display of photographs, it is often desired to change their location as well as the subject being displayed. At the present time, no single relatively inexpensive display means is available which is readily adaptable for standing and hanging and which permits the pictures to be changed quickly and conveniently, without the likelihood of their being damaged.

The presently available economical mounting devices generally have several drawbacks. The conventional glass and metal frame, while normally providing adequate protection for the picture, is somewhat cumbersome when it is desired to change the picture currently being displayed. Furthermore, such a device is subject to breakage and consequent damage to the picture it contains. In addition, it is not normally satisfactory for storage of pictures other than the one being displayed. Other very inexpensive frames include multi-layered plastic or cardboard constructions which provide little or no protection for the picture and is itself subject to warping. Although these prior art frames often include means for both standing and hanging, they are normally best suited for one, and only marginally suited for the other method of display.

SUMMARY OF THE INVENTION

Accordingly, it is the primary object of this invention to provide a rigid, lightweight, inexpensive picture display means which is equally adapted to hang on a wall and stand on a flat surface, which provides storage space for several pictures, and which provides adequate protection for the displayed subject while permitting quick and convenient interchangeability thereof.

This invention is a valuable contribution to the popular field of photograph and snapshot framing and concurrently solves the parallel need for ready changeability. Reference is made here to my earlier application, Ser. No. 619,409, filed Feb. 28, 1967, now Pat. 3,416,765, which concerns a non-changeable, frameless picture support having an external appearance somewhat similar to the present invention. The earlier invention has a different purpose and satisfies different needs. Broadly speaking, the present invention resides in a rigid, lightweight, hollow body having an aperture in one broad face through which a picture may be viewed and an opening in the base through which a retaining member is inserted which holds the picture against the inside edges of the hollow body surrounding the aperture. The retaining member and the hollow body cooperate to provide a snap-in-tap-out feature whereby the retaining member snaps into place in the body but is easily removed by tapping the base of the body against another object. The retaining member is provided with concentrated mass for purposes of lowering the center of gravity of the picture holder to enhance its stability when it stands freely on a flat surface. There is no need for folding or attached supports for either standing or hanging because the structure incorporates the necessary means for display by either method.

This picture holder is capable of storing several pictures behind the one being displayed. The displayed subject is easily changed by simply tapping out the retaining member which releases the pictures, rearranging the order of pictures as desired and reinserting the retaining member and pictures in the hollow body. The picture holder is, preferably, made of a medium impact plastic so that there is little likelihood of damage to either it or its enclosed pictures. The retaining member provides a solid rigid surface for full support of the pictures. If desired, an acetate sheet may be inserted between the pictures and the inside edges of the framed aperture to further protect the pictures from possible surface damage. The rigid hollow body construction provides a structural advantage in that it is lightweight but has no tendency to warp with age, with the result that the pictures held therein are always maintained flat.

BRIEF DESCRIPTION OF THE DRAWING

FIG. 1 is a perspective view of the picture holder constructed in accordance with the principles of this invention;

FIG. 2 is a sectional view taken through cutting plane 2—2 of FIG. 1;

FIG. 2A is an enlarged sectional view of a portion of FIG. 2;

FIG. 3 is a perspective view of the picture holder retainer together with several sheets of material which it holds in position within the hollow body;

FIG. 4 is a front view of the picture holder of FIG. 1 with an example of a photograph being displayed thereby; and FIG. 5 is a bottom view of the picture holder of FIG. 1.

DESCRIPTION OF THE PREFERRED EMBODIMENT

With reference now to the drawing, there is shown a picture holder 11 comprising hollow body 12 and retainer 13. FIGS. 1 and 2 show a sheet of acetate 14 covering the flat face of the retainer and supported by the inside edges of the front aperture 15 in body 12. Pictures 16 shown in FIGS. 3 and 4 normally reside between retainer 13 and acetate sheet 14.

The detailed structure of hollow body 12 is shown in FIG. 2. Body 12 is a rigid, light weight, hollow structure having an aperture 15 in the front surrounded by frame edges 17 which may have any desired ornamental configuration. The extreme outside edges 21 of frame edges 17 are beveled slightly rearwardly. These beveled edges enhance the aesthetic appearance of the frame and at the same time prevent the creation of sharp edges which would be subject to possible chipping. Because the contemplated method of manufacturing this product is by injection molding, the beveled edges have another advantage in that they are more easily formed than are sharp edges. Hollow body 12 is formed with a plain back 22 and gently sloping top and sides 23 and 24 respectively, which terminate in frame edges 17 at the front. Back 22 slopes slightly forward from the base to thereby add to the overall graceful and eye pleasing appearance of the body structure. The base of body 12 is formed with an elongated horizontal leg 25 spaced slightly rearwardly from the front of bottom frame edge 17. When the picture holder stands on a flat surface, it rests on leg 25 and bottom edge 26 of back 22 so that the front face is tilted back slightly to enhance the overall aesthetic appearance of the picture and its holder. A depression near the bottom of back 22 is provided by means of a hole 27 which is adjacent to tapered rounded groove 28. The functions of these features will be discussed below. The picture holder may be hung on a wall by means of opening 29 through back 22.

The structure of retainer 13 is best illustrated in FIGS. 2 and 3. The retainer has a rigid flat facing 31 which fits within hollow body 12 and abuts edges 32 on the inside of frame edges 17. Retainer 13 has a base 33 which is formed with rounded forward edge 34 and a straight rear edge 35 having a chamfer 36. A projection 37, which may have any desired shape such as hemispherical, is formed at the center of rear edge 35. Base 33 of retainer 13 is connected to facing 31. A relative flexibility between the facing and the base of the retainer is provided by means of groove 41 which substantially reduces the thickness of the facing as it joins the base. The function of this flexibility will be discussed below. The edges of facing 31 are tapered so as to mate with the inside surfaces of hollow body top 23 and sides 24, when retainer 13 is inserted therein. Retainer 13 is also formed with ribs 42 which have the pupose of concentrating the mass of the holder. With ribs 42 formed near base 33, the center of gravity of picture holder 11 is significantly lowered, thereby greatly enhancing its stability when standing freely on a flat surface. Note that there is no connection between the ribs, which are attached to facing 31, and the base, thereby permitting the flexibility mentioned above.

In order to provide for substantially uniform curing of the material of the retainer when formed, as, for example, by injection molding of plastic, ribs 42 are substantially the same thickness as base 33 and facing 31.

The following details are best shown in FIG. 2A. As retainer 13 is inserted into body 12 through opening 38 in its base, rear edge 35 first makes contact with bottom edge 26 of back 22. Chamfer 36 prevents the retainer from being caught on edge 26 and allows it to pass smoothly upward into body 12. Projection 37 then engages groove 28 and slides upward smoothly as the center of the bottom of back 22 flexes slightly outwardly to allow the projection to engage the depression formed by hole 27, thereby holding retainer 13 firmly in place. When the retainer is fully inserted into the body, the top of facing 31 lies closely adjacent or abuts the inside of top 23 of the body and rounded edge 34 of the base abuts shoulder 43 just behind leg 25. A slight clearance normally exists between side edges 44 of retainer 13 and the sides 24 of body 12, as shown in FIG. 5. The retainer is easily removed from body 12 by sharply tapping leg 25 on an external object, thereby inducing projection 37 to become disengaged from hole 27 and allowing the retainer to drop out of the body.

A single picture or a layer of acetate together with several pictures may be placed adjacent the flat surface of facing 31 before retainer 13 is inserted into body 12. The acetate not only functions as a protective cover for the picture, but also enhances the ease with which the retainer is inserted into and removed from the body 12 because of acetate's low co-efficient of friction. When a layer of acetate and several pictures are inserted with the retainer, the resulting thickness causes facing 31 of retainer 13 to move slightly rearwardly within body 12. The slope of top 23 forces facing 31 proportionally downward. Since retainer 13 is held in place by projection 37 in hole 27, the downward displacement results in a slight relative bending between facing 31 and base 33, which bending is accommodated by groove 41. With several pictures in the holder, base 33 also is displaced slightly rearwardly. This is permitted by the slight clearance existing between the retainer edges and the sides of the hollow body as shown in FIG. 5. Further, in order to prevent the base from becoming wedged between sides 24 when it moves rearwardly, the rearward taper of the retainer is slightly sharper, of the order of ½ degree, than the rearward taper of the body.

It is evident from the foregoing that this picture holder may be used to mount one picture for display and several for storage and that it firmly retains the mounted and stored pictures in a safe, flat condition, fully protected from external damage. At the same time the pictures may be readily changed an unlimited number of times without degrading the picture holder or destruction of the pictures therein. No special tools or skills are necessary for one to mount one or several pictures within this picture holder and to change the pictures on display at will. The bottom surface of base 33 is flat and may be used for imprinting instructions or comments about the item displayed if desired. The picture holder herein described presents a clean uncluttered appearance and may be stood or hung in groupings according to the creative tastes of the owner. The picture holders are light and provide excellent means for shipping gift photographs by mail while at the same time providing a useful picture holder for the recipient to use with whatever pictures he may desire.

The material used in the manufacture of this picture holder is normally a medium impact thermal plastic suitable for injection molding such as polystyrene or buytare. The rigidity and structural soundness of this three-dimensional frame provide an advantage in the handling and shipping of these frames which is not possible with conventional frames without careful and extensive packing.

The foregoing is but one embodiment of a picture holder constructed in accordance with the principles disclosed herein. Many alternatives are likely to occur to those skilled in this art. For example, the retainer retaining projection, instead of being formed with the retainer, may be a part of either the back or the front portion of the main body. In such case, an edge of the base would merely snap in over the projection. Similarly, mass concentrating ribs 42 may be attached to base 33 rather than to face 31. If it is desired that the picture holder stand slightly higher off its resting surface, the front leg may be made slightly longer and a leg added to the bottom of back 22 which would maintain the slight rearward tilt of the front face of the picture holder. The front viewing aperture may be of any desired shape other than rectangular. These and other modifications are well within the spirit and scope of the invention disclosed herein.

What is claimed is:

1. A picture holder comprising:
a substantially rigid hollow body having an aperture through the front thereof and a rear wall spaced rearwardly from said front aperture; and
a removable substantially rigid retainer adapted to firmly support pictures within said body for viewing through said aperture, said retainer having a groove thereacross permitting slight flexing of one portion of said retainer with respect to the other portion.

2. The picture holder recited in claim 1, wherein:
said hollow body is formed with flat interior surfaces surrounding said aperture and facing said rear wall, said flat interior surfaces lying in a plane; and
said retainer is shaped and configured to reside within said body between said rear wall and said flat interior surfaces and is formed with a flat facing adapted to lie adjacent and parallel to said flat interior surfaces.

3. The picture holder recited in claim 2, wherein:
said hollow body has an opening in its base through which said retainer is inserted and removed;
said rear wall is formed with a depression near the bottom thereof;
said retainer has a base formed with a projection adapted to engage said depression in said rear wall to normally maintain said retainer in place in said hollow body.

4. The picture holder recited in claim 3, wherein:
said rear wall is formed with a tapered groove adjacent and below said depression, said groove being adapted to facilitate insertion of said retainer into said hollow body by providing a sloping surface for guiding said projection into said depression.

5. The picture holder recited in claim 3, wherein:
said base of said retainer is flexibly connected to said flat facing to permit downward movement of said flat facing while said projection remains engaged in said depression in said rear wall.

6. The picture holder recited in claim 3, wherein:
said retainer is formed with a plurality of ribs adjacent said base, said ribs substantially increasing the mass of said retainer and providing said picture holder with a low center of gravity.

7. The picture holder recited in claim 1, wherein:
said hollow body is formed with a leg on the bottom thereof, said picture holder being adapted to stand on a flat surface, being supported by the bottom edge of said rear wall and said leg, said leg causing the front of said picture holder to tilt rearwardly.

8. The picture holder recited in claim 4, wherein:
said projection is smoothly rounded; and
said rear wall is flexible to permit engagement and disengagement of said projection by said depression near the bottom of said rear wall.

9. The picture holder recited in claim 3, wherein:
said rear wall is formed with an opening near the top thereof whereby said picture holder is adapted to be hung on a wall.

10. The picture holder recited in claim 1, wherein:
said hollow body includes top and side walls sloping from the periphery of the front thereof to the periphery of said rear wall.

11. The picture holder recited in claim 2, and further comprising:
a removable thin sheet of transparent material substantially covering said flat facing of said clamp.

12. The picture holder recited in claim 10, wherein:
said rear wall slopes forward from the bottom of said picture holder with respect to the front thereof.

13. The picture holder recited in claim 5, wherein:
said hollow body includes a top wall sloping downwardly from the top of the front of said hollow body to the top of said rear wall; and
the top edge of said flat facing is adapted to abut the inside surface of said top wall to force said flat facing downwardly as said flat facing is displaced rearwardly by insertion of a plurality of pictures.

References Cited

UNITED STATES PATENTS

| | | | |
|---|---|---|---|
| 2,540,951 | 2/1951 | Kellems | 40—154 |
| 3,420,361 | 1/1969 | Newberg | 40—154X |

JEROME SCHNALL, Primary Examiner

W. J. CONTRERAS, Assistant Examiner